No. 652,975. Patented July 3, 1900.
F. J. NEWBURY.
RUBBER COVERED ARTICLE OR TUBING AND METHOD OF MAKING SAME.
(Application filed Feb. 12, 1900.)
(No Model.)
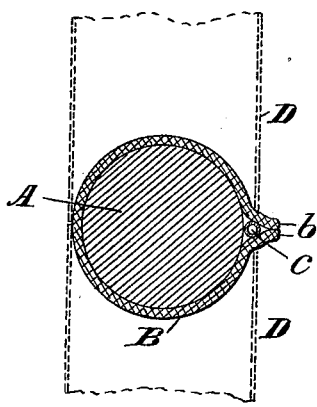
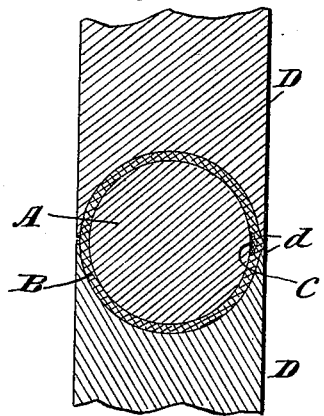
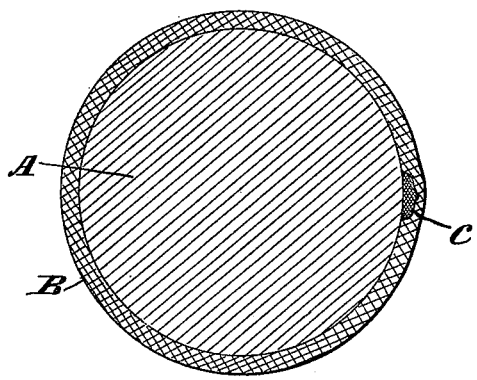
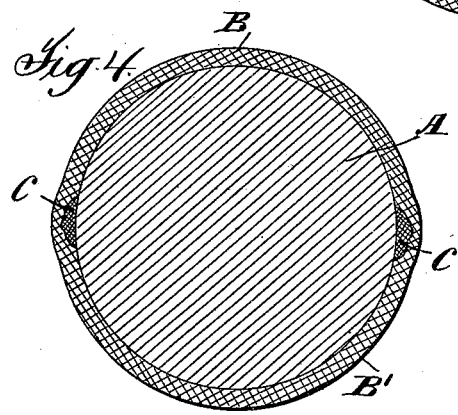
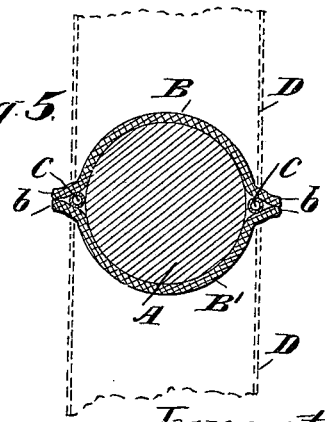

UNITED STATES PATENT OFFICE.

FRANK J. NEWBURY, OF TRENTON, NEW JERSEY, ASSIGNOR TO THE JOHN A. ROEBLING'S SONS COMPANY, OF SAME PLACE.

RUBBER-COVERED ARTICLE OR TUBING AND METHOD OF MAKING SAME.

SPECIFICATION forming part of Letters Patent No. 652,975, dated July 3, 1900.

Application filed February 12, 1900. Serial No. 4,906. (No model.)

*To all whom it may concern:*

Be it known that I, FRANK J. NEWBURY, a citizen of the United States, residing at Trenton, county of Mercer, and State of New Jersey, have invented certain new and useful Improvements in Rubber-Covered Articles or Tubing and Methods of Making Same, fully described and represented in the following specification and the accompanying drawings, forming a part of the same.

Electric cables and other cylindrical articles are commonly covered with rubber by folding around the cable longitudinally a sheet of rubber of the required thickness, with the edges abutting and projecting from the cable on one side, and then trimming off the projecting portions and compressing the edges to form the seam of the completed rubber tubing inclosing the article, this operation being usually performed by a pair of rotating grooved rollers with cutters on one side. Difficulties are experienced in this method of forming the rubber tubing, especially in that a wrinkle or crease is formed at the seam, in which the rubber tubing is thinner than at other points, which is especially objectionable in the case of rubber insulation, and in that it is difficult to make the seam as strong as the other parts of the rubber tubing. The same difficulties occur if two sheets of rubber are used, so as to form seams on opposite sides of the tubing. I overcome these difficulties and provide an improved rubber tubing or covering for conductors, cables, or other cylindrical articles by running in with the rubber sheet forming the tubing a piece of rubber on the line or lines on which the seam or seams are to be formed, so as to provide extra rubber stock which in the formation of the seam will be pressed into the latter, thus avoiding the formation of the wrinkle or crease above referred to and securing the same thickness and strength of the rubber tubing at the seam as elsewhere. The additional piece of rubber thus introduced into the seam may be a solid piece and of any desired form and may be placed in any desired position relatively to the edges of the rubber sheet, so as to secure the desired result of its incorporation with the edges of the rubber sheet at the seam, within the invention considered broadly; but I preferably use a cylindrical piece of rubber, as its proper position may more readily be secured and a better result is secured than with other forms, and the piece of rubber is preferably run in at the seam between the conductor or other article being covered and the rubber sheet. I have found also that the best results are secured with a small hollow cylinder or tube of rubber, which flattens out and spreads into the seam better than a solid piece of rubber and better secures the desired result of a rubber tubing uniform in strength and thickness.

The invention includes certain improved methods in forming rubber tubing or coverings and an improved rubber tubing and rubber-covered article, all as fully described and claimed hereinafter.

In the accompanying drawings, forming a part of this specification, I have illustrated the invention in connection with a pair of compressing and cutting rollers for forming the seam, in which drawings—

Figure 1 is a section showing the rubber-wrapped article as it passes to the rollers in forming the seam, the rollers being shown in dotted lines. Fig. 2 is a similar view with the rollers in full lines, showing the completed article as it passes from the rollers. Fig. 3 is an enlarged section of the completed article, indicating approximately the construction of the seam. Fig. 4 is a view similar to Fig. 3, showing a modified form of tubing. Fig. 5 is a view similar to Fig. 1, showing the process of forming the tubing of Fig. 4.

Referring to said drawings, A is the article to be covered. B is the rubber sheet wrapped around the article, with the projecting edges *b*, and *c* a small tube of rubber run in between the article A and rubber sheet B at the seam for incorporation therein, and D the rollers, having the usual cutters *d* on one side for trimming off the edges *b*.

The operation will be clear from the drawings, it being understood that, as shown in Fig. 1, the article A with the rubber sheet B wrapped around it, and the tube *c* are just being fed between the rollers D, and in Fig. 2 have been acted upon by the rollers and the seam formed, while Fig. 3 shows, on a larger scale, the completed construction with the rubber tubing on the article A and indicates approximately the form taken by the strip c in the seam when it is run in between the article A and wrapping B, as shown in the drawings.

In some cases it may be desirable to form the rubber tubing or covering of two strips of rubber with seams at opposite sides, and such a construction is shown in Fig. 4, the tubing being formed of two strips B B' with seams at opposite sides, each of said seams being formed with the tube c inserted in the same manner as described in connection with Figs. 1 to 3. It will be understood that in producing the construction shown in Fig. 4 by rollers, as in the process illustrated in Figs. 1 and 2, the rollers will be constructed so as to trim and compress the material into a seam on both edges of the rollers instead of only at one edge, as indicated in Fig. 5.

It will be understood that the core A, on which the rubber tubing is formed, may be a conductor, cable, or other article on which the tubing is to remain as a covering, or it may be a core or mandrel of any character upon which the tubing is to be formed and from which the tubing may be removed for use as desired.

It will be understood that the invention is not to be limited to forming the tubing by rollers, as illustrated, as this roller mechanism is only the preferred form of mechanism which may be used for carrying out my methods and producing the articles forming my invention, and other forms of mechanism may be used.

What I claim is—

1. The method of forming seams between the edges of rubber tubing, which consists in compressing together the edges and a piece of rubber extending parallel therewith, substantially as described.

2. The method of forming seams between the edges of rubber tubing, which consists in compressing together the edges and a cylindrical piece of rubber extending parallel therewith, substantially as described.

3. The method of forming seams between the edges of rubber tubing, which consists in compressing together the edges and a tube of rubber extending parallel therewith, substantially as described.

4. The method of forming rubber tubing which consists in wrapping the rubber longitudinally about a core with the edges abutting at the seam, adding at the seam a piece of rubber parallel with the edges, and compressing the edges and piece of rubber to form the seam, substantially as described.

5. The method of forming rubber tubing which consists in wrapping the rubber longitudinally about a core with the edges abutting at the seam, adding at the seam a cylindrical piece of rubber parallel with the edges, and compressing the edges and piece of rubber to form the seam, substantially as described.

6. The method of forming rubber tubing which consists in wrapping the rubber longitudinally about a core with the edges abutting at the seam, adding at the seam a tube of rubber parallel with the edges, and compressing the edges and rubber tube to form the seam, substantially as described.

7. The method of forming rubber tubing which consists in wrapping the rubber longitudinally about a core with the edges of the wrapper abutting and projecting at the seam, inserting between the core and the rubber wrapping at the seam and parallel with the edges a piece of rubber, and trimming off the projecting edges and compressing the edges and piece of rubber to form the seam, substantially as described.

8. The method of forming rubber tubing which consists in wrapping the rubber longitudinally about the core with the edges of the wrapper abutting and projecting at the seam, inserting between the core and the rubber wrapping at the seam and parallel with the edges a cylindrical piece of rubber, and trimming off the projecting edges and compressing the edges and piece of rubber to form the seam, substantially as described.

9. The method of forming rubber tubing which consists in wrapping the rubber longitudinally about a core with the edges of the wrapper abutting and projecting at the seam, inserting between the core and the rubber wrapping at the seam and parallel with the edges a tube of rubber, and trimming off the projecting edges and compressing the edges and rubber tube to form the seam, substantially as described.

10. The method of covering a conductor or other article with rubber which consists in wrapping the rubber longitudinally about the article with the edges abutting and projecting, inserting a piece of rubber at the seam parallel with the edges, and trimming off the projecting edges and compressing the edges and piece of rubber to form the seam by running the article with the rubber wrapping and piece of rubber between compressing and cutting rollers, substantially as described.

11. The method of covering a conductor or other article with rubber which consists in wrapping the rubber longitudinally about the article with the edges abutting and projecting, inserting a cylindrical piece of rubber at the seam parallel with the edges, and trimming off the projecting edges and compressing the edges and piece of rubber to form the seam by running the article with the rubber wrapping and piece of rubber between compressing and cutting rollers, substantially as described.

12. The method of covering a conductor or other article with rubber which consists in wrapping rubber longitudinally about the conductor with the edges abutting and projecting, inserting a tube of rubber at the seam parallel with the edges, and trimming off the projecting edges and compressing the edges and rubber tube to form the seam by running the article with the rubber wrapping and rubber tube between compressing and cutting rollers, substantially as described.

13. A rubber-covered article having a rubber cover with a longitudinal seam or seams consisting of the edges of the cover-sheet and a small piece of rubber extending parallel with said edges and compressed therewith, substantially as described.

14. Rubber tubing with a longitudinal seam or seams consisting of the edges of the tubing and a small piece of rubber extending parallel with said edges and compressed therewith, substantially as described.

In testimony whereof I have hereunto set my hand in the presence of two subscribing witnesses.

FRANK J. NEWBURY.

Witnesses:
CHARLES C. COOLEY,
MARY K. ZISGEN.